United States Patent
Li et al.

(10) Patent No.: US 10,915,980 B2
(45) Date of Patent: Feb. 9, 2021

(54) METHOD AND APPARATUS FOR ADDING DIGITAL WATERMARK TO VIDEO

(71) Applicant: Baidu Online Network Technology (Beijing) Co., Ltd., Beijing (CN)

(72) Inventors: Xubin Li, Beijing (CN); Errui Ding, Beijing (CN); Shilei Wen, Beijing (CN); Xiao Liu, Beijing (CN); Hao Sun, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 304 days.

(21) Appl. No.: 16/134,659

(22) Filed: Sep. 18, 2018

(65) Prior Publication Data
US 2019/0164250 A1 May 30, 2019

(30) Foreign Application Priority Data
Nov. 28, 2017 (CN) .......................... 2017 1 1215661

(51) Int. Cl.
*G06K 9/00* (2006.01)
*G06T 1/00* (2006.01)
*H04N 21/8358* (2011.01)

(52) U.S. Cl.
CPC ............ *G06T 1/0064* (2013.01); *G06T 1/005* (2013.01); *G06T 1/0028* (2013.01); *H04N 21/8358* (2013.01)

(58) Field of Classification Search
CPC ..... G06T 1/0064; G06T 1/0028; G06T 1/005; H04N 21/8358

USPC ......................................................... 382/100
See application file for complete search history.

(56) References Cited

U.S. PATENT DOCUMENTS

| | | | |
|---|---|---|---|
| 9,947,066 B2 * | 4/2018 | Kim ........................ | G06T 1/005 |
| 10,475,145 B1 * | 11/2019 | Lester ....................... | G06T 7/11 |
| 10,565,168 B2 * | 2/2020 | Chang ................... | G06F 16/178 |

FOREIGN PATENT DOCUMENTS

| | | | |
|---|---|---|---|
| CN | 105611380 A | 5/2016 | |
| CN | 105898561 A | 8/2016 | |

OTHER PUBLICATIONS

Zhang, Peng, Tony Thomas, and Tao Zhuo. "An object-based video authentication mechanism for smart-living surveillance." 2015 International Conference on Orange Technologies (ICOT). IEEE, 2015. (Year: 2015).*

(Continued)

*Primary Examiner* — Jonathan S Lee
(74) *Attorney, Agent, or Firm* — Seed IP Law Group LLP

(57) ABSTRACT

Embodiments of the present disclosure disclose a method and apparatus for adding a digital watermark in a video. A specific embodiment of the method includes: performing target detection on each frame of image in a target video; determining, based on a target detection result, whether the target video includes at least one carrier, the carrier referring to an object for adding a digital watermark in the each frame of image; and determining a target carrier from the at least one carrier, and adding the digital watermark to an area of the target carrier in the each frame of image including the target carrier in the target video, in response to determining the target video including the at least one carrier.

13 Claims, 4 Drawing Sheets

(56) References Cited

OTHER PUBLICATIONS

Chen, Dandi, Siyu Xia, and Kaiyue Lu. "A JND-based saliency map fusion method for digital video watermarking." 2015 34th Chinese Control Conference (CCC). IEEE, 2015. (Year: 2015).*
Walther, Dirk, and Christof Koch. "Modeling attention to salient proto-objects." Neural networks 19.9 (2006): 1395-1407. (Year: 2006).*
Agarwal, Himanshu, et al. "Visible watermarking based on importance and just noticeable distortion of image regions." Multimedia Tools and Applications 75.13 (2016): 7605-7629. (Year: 2016).*

* cited by examiner

METHOD AND APPARATUS FOR ADDING DIGITAL WATERMARK TO VIDEO

CROSS-REFERENCE TO RELATED APPLICATIONS

This application claims priority to Chinese Patent Application no. 201711215661.6, filed with the China National Intellectual Property Administration (CNIPA) on Nov. 28, 2017, the contents of which are incorporated herein by reference in their entirety.

TECHNICAL FIELD

Embodiments of the present disclosure relate to the field of computer technology, specifically relate to the field of information processing technology, and more specifically relate to a method and apparatus for adding a digital watermark to a video.

BACKGROUND

Adding a digital watermark to a video can solve the problem of video copyright and reduce the risk of video infringement by others. Currently a digital watermark may be added to a video by various methods. For example, a static watermark (such as a station logo) may be added at a fixed location of each frame of the video, or a full-screen dynamic watermark (such as an opening animation) may be inserted into the video at a specific time, or redundant binary data may also be embedded in the video. However, the digital watermarks added by the above methods can be easily detected and removed. For example, the watermark at a fixed location can be removed in batches by finding the location of the watermark, and blurring or replacing it.

SUMMARY

Embodiments of the present disclosure propose a method and apparatus for adding a digital watermark to a video.

In a first aspect, the embodiments of the present disclosure provide a method for adding a digital watermark to a video, including: performing target detection on each frame of image in a target video; determining, based on a target detection result, whether the target video includes at least one carrier, the carrier referring to an object for adding a digital watermark in the each frame of image; and determining a target carrier from the at least one carrier, and adding the digital watermark to an area of the target carrier in the each frame of image including the target carrier in the target video, in response to determining the target video including the at least one carrier.

In some embodiments, the performing target detection on each frame of image in a target video includes: importing the each frame of image in the target video into a pre-established target detection model to obtain a contour, a location, and a type of the carrier in the each frame of image, wherein the target detection model is used to represent a corresponding relationship between the each frame of image and the contour, a location, and a type of the carrier.

In some embodiments, the target detection model is a neural network model; and the method further includes steps of training the target detection model, including: determining a sample image as an input sample, and determining the contour, the location, and the type of the carrier included in the sample image as an output sample; and training an initial neural network using the input sample and the output sample to obtain the neural network model.

In some embodiments, the determining a target carrier from the at least one carrier includes: performing, for each of the at least one carrier, the following steps: extracting an image characteristic of the carrier from the frame of image being first provided with the carrier; performing image tracking on the each frame of image subsequent to the frame of image based on the image characteristic of the carrier, and determining whether the carrier exists in the each frame of image subsequent to the frame of image; and counting a number of the frame of image being provided with the carrier in the target video based on an image tracking result; and determining, based on the obtained number of the frame of image being provided with the each of the at least one carrier in the target video, the target carrier from the at least one carrier.

In some embodiments, the method further includes: adding the digital watermark at a specified location on the each frame of image in the target video, in response to determining the target video not including the at least one carrier.

In some embodiments, the digital watermark is a visible watermark; and the adding the digital watermark to an area of the target carrier in the each frame of image including the target carrier in the target video includes: adjusting a shape of the visible watermark based on the contour and the type of the target carrier; and adding the shape-adjusted visible watermark at the location of the target carrier.

In some embodiments, the digital watermark includes a background area and a logo area; and the adding the digital watermark to an area of the target carrier in the each frame of image including the target carrier in the target video includes: adjusting a color of the background area of the digital watermark according to a color distribution of the target carrier; and adding the digital watermark having the color of the background area adjusted at the location of the target carrier.

In a second aspect, the embodiments of the present disclosure provide an apparatus for adding a digital watermark to a video, including: a detection unit, configured to perform target detection on each frame of image in a target video; a determination unit, configured to determine, based on a target detection result, whether the target video includes at least one carrier, the carrier referring to an object for adding a digital watermark in the each frame of image; and a first adding unit, configured to determine a target carrier from the at least one carrier, and add the digital watermark to an area of the target carrier in the each frame of image including the target carrier in the target video, in response to determining the target video including the at least one carrier.

In some embodiments, the first adding unit is further configured to: import the each frame of image in the target video into a pre-established target detection model to obtain a contour, a location, and a type of the carrier in the each frame of image, wherein the target detection model is used to represent a corresponding relationship between the each frame of image and the contour, the location, and the type of the carrier.

In some embodiments, the target detection model is a neural network model; and the apparatus further includes a training unit, configured to: determine a sample image as an input sample, and determine the contour, the location, and the type of the carrier included in the sample image as an output sample; and train an initial neural network using the input sample and the output sample to obtain the neural network model.

In some embodiments, the first adding unit is further configured to: perform, for each of the at least one carrier, the following steps: extracting an image characteristic of the carrier from the frame of image being first provided with the carrier; performing image tracking on the each frame of image subsequent to the frame of image based on the image characteristic of the carrier, and determining whether the carrier exists in the each frame of image subsequent to the frame of image; and counting a number of the frame of image being provided with the carrier in the target video based on an image tracking result; and determine, based on the obtained number of the frame of image being provided with the each of the at least one carrier in the target video, the target carrier from the at least one carrier.

In some embodiments, the apparatus further includes: a second adding unit, configured to add the digital watermark at a specified location on the each frame of image in the target video, in response to determining the target video not including the at least one carrier.

In some embodiments, the digital watermark is a visible watermark; and the first adding unit is further configured to: adjust a shape of the visible watermark based on the contour and the type of the target carrier; and add the shape-adjusted visible watermark at the location of the target carrier.

In some embodiments, the digital watermark includes a background area and a logo area; and the first adding unit is further configured to: adjust a color of the background area of the digital watermark according to a color distribution of the target carrier; and add the digital watermark having the color of the background area adjusted at the location of the target carrier.

In a third aspect, the embodiments of the present disclosure provide a terminal, including: one or more processors; and a storage apparatus, for storing one or more programs, the one or more programs, when executed by the one or more processors, cause the one or more processors to implement the method according to any one of the implementations of the first aspect.

In a fourth aspect, the embodiments of the present disclosure provide a computer readable storage medium, storing a computer program thereon, the program, when executed by a processor, implements the method according to any one of the implementations of the first aspect.

The method and apparatus for adding a digital watermark to a video provided by the embodiments of the present disclosure first performs target detection on each frame of image in a target video, then determines, based on a target detection result, whether the target video includes at least one carrier, and finally determines a target carrier from the at least one carrier, and adds the digital watermark to an area of the target carrier in the each frame of image including the target carrier in the target video, in response to determining the target video including the at least one carrier. Therefore, the location of the digital watermark continuously changes with the change of the location of the target carrier, the added digital watermark may not be easily detected and removed, thereby improving the safety of the video.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
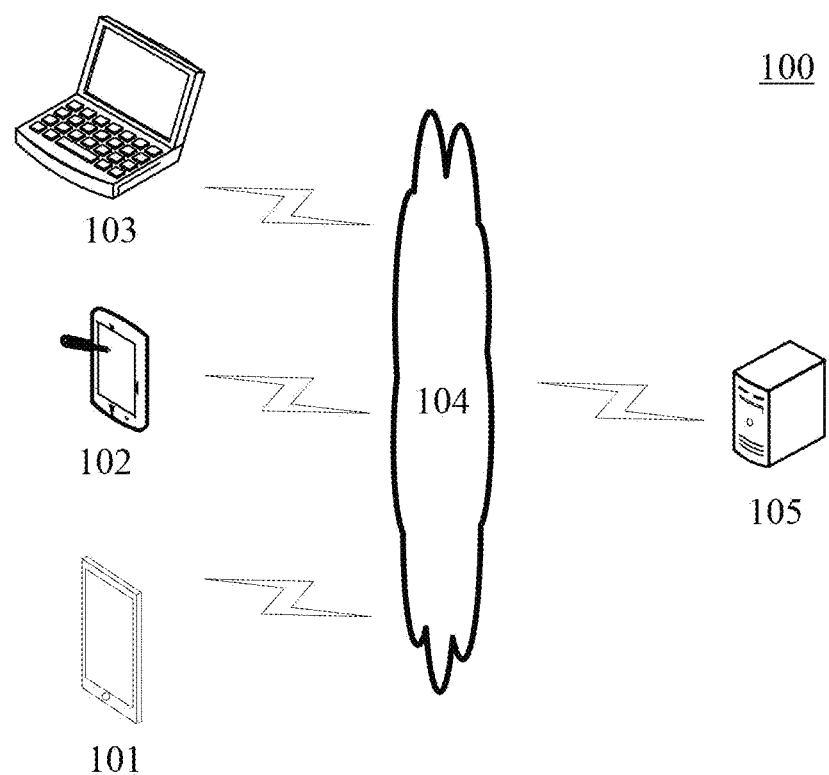
FIG. 1 is an exemplary system architecture diagram to which the present disclosure may be applied.

FIG. 1 shows an illustrative architecture of a system 100 which may be used by a method for adding a digital watermark in a video or an apparatus for adding a digital watermark in a video according to the embodiments of the present application.

As shown in FIG. 1, the system architecture 100 may include terminal devices 101, 102, and 103, a network 104 and a server 105. The network 104 serves as a medium providing a communication link between the terminal devices 101, 102, and 103, and the server 105. The network 104 may include various types of connections, such as wired or wireless transmission links, or optical fibers.

The user may use the terminal device 101, 102, or 103 to interact with the server 105 through the network 104, in order to transmit or receive messages, etc. Various communication client applications, such as webpage browser applications, shopping applications, video playing applications, and video processing applications may be installed on the terminal devices 101, 102, and 103.

The terminal devices 101, 102, and 103 may be various electronic devices having a display and capable of processing a video, including but not limited to, smart phones, tablet computers, laptop computers, and desktop computers.

The server 105 may be a server providing various services, for example, a back end server providing support for the information displayed on the terminal device 101, 102 or 103. The back end server may process a received video (for example, adding a digital watermark), and return a processing result to the terminal device.

It should be noted that the method for adding a digital watermark in a video according to the embodiments of the present application may be executed by the terminal device 101, 102, or 103, may be executed by the server 105. Accordingly, an apparatus for adding a digital watermark in a video is generally installed on the terminal device 101, 102, or 103, or installed on the server 105, which is not limited in the present disclosure.

It should be appreciated that the numbers of the terminal devices, the networks and the servers in FIG. 1 are merely illustrative. Any number of terminal devices, networks and servers may be provided based on the actual requirements.

Figure 2:
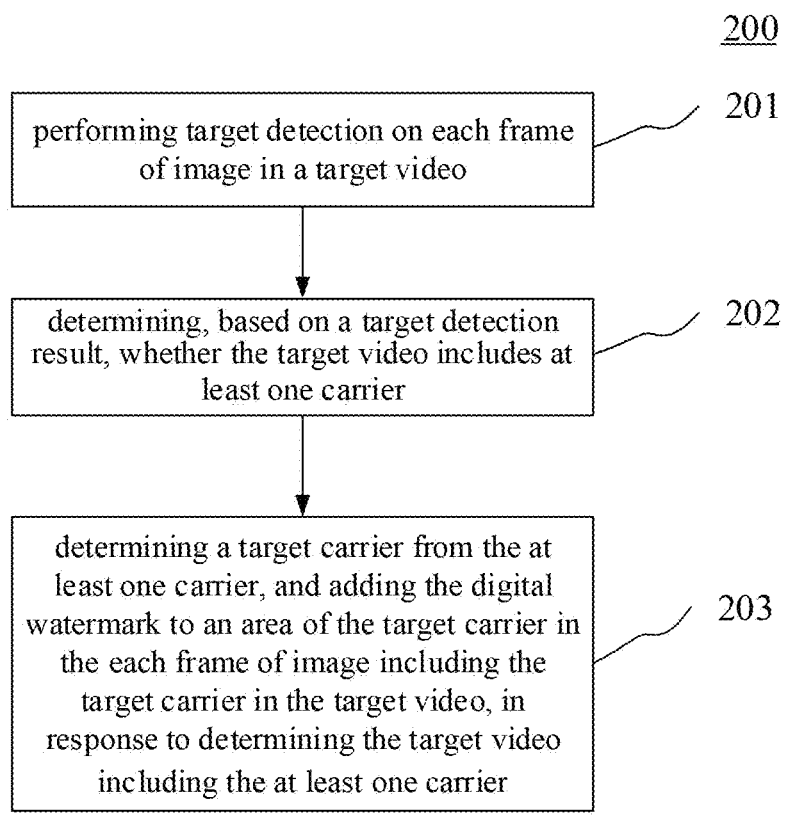
FIG. 2 is a flowchart of an embodiment of a method for adding a digital watermark to a video according to the present disclosure.

With further reference to FIG. 2, a flow 200 of an embodiment of the method for adding a digital watermark to a video according to the present disclosure is illustrated. The method for adding a digital watermark to a video includes the following steps:

Step 201, performing target detection on each frame of image in a target video.

In the present embodiment, the electronic device (e.g., the terminal devices 101, 102, or 103 as shown in FIG. 1) on which the method for adding a digital watermark to a video operate may perform target detection on each frame of image in a target video. Here, the target video is a video to which the digital watermark needs to be added. The electronic device may perform target detection on the each frame of image in the target video by using various target detection methods (for example, an object detection method based on image segmentation technology, a target detection method based on image characteristic matching, or a frequency domain based method).

In some alternative implementations of the present embodiment, the step 201 may specifically include: importing the each frame of image in the target video into a pre-established target detection model to obtain a contour, a location, and a type of the carrier in the each frame of image. Here, the target detection model is used to represent a corresponding relationship between the each frame of image and the contour, the location, and the type of the carrier. Here, the contour of the carrier may be an area surrounded by a plurality of points. For example, when the carrier is a rectangular object in the image, the contour of the carrier may be a rectangular area surrounded by the four vertices of the rectangular object. As another example, when the carrier is a circular object in the image, the contour of the carrier may be a circular area surrounded by a plurality of points. The type of the carrier may refer to the shape type of the carrier. For example, the type of the carrier may include a rectangle, a polygon, a circle, an oval, a triangle, and the like. For example, the target detection model may be a corresponding relationship table storing a plurality of corresponding relationships between the images and the contours, locations, and types of the carriers pre-established by technicians based on statistics on a large number of images and contours, locations and types of carriers.

In some alternative implementations, the target detection model may be a neural network model. The method for adding a digital watermark to a video may further include steps of training the target detection model. Here, the steps of training the target detection model may specifically include: first, the electronic device or other electronic devices for training the target detection model may determine a sample image as an input sample, and determine the contour, the location, and the type of the carrier included in the sample image as an output sample, and then may train an initial neural network using the input sample and the output sample to obtain the neural network model. Here, the initial neural network may be a neural network obtained by various methods, for example, a neural network obtained by randomly generating network parameters of the neural network based on an existing neural network (such as a convolutional neural network, a cyclic neural network, a deep neural network, etc.), Step 202, determining, based on a target detection result, whether the target video includes at least one carrier.

In the present embodiment, the electronic device may determine, based on the target detection result of step 201, whether the target video includes the at least one carrier. Here, the carrier refers to an object in the target video for adding a digital watermark. For example, the carrier may be a rectangular object, a polygonal object, a circular object, an oval object, or the like in the each frame of image. Digital watermarking technology embeds some identification information (i.e., the digital watermark) directly into a digital carrier (including multimedia, documents, software, etc.) or indirectly expresses (modifies the structure of a specific area) without affecting the use value of the original carrier, and cannot be easily detected and modified again. However, it may be identified and recognized by the producer. For example, in the present embodiment, the digital watermark may be a digital image (e.g., a trademark image, a station logo).

Step 203, determining a target carrier from the at least one carrier, and adding the digital watermark to an area of the target carrier in the each frame of image including the target carrier in the target video, in response to determining the target video including the at least one carrier.

In the present embodiment, the electronic device may determine a target carrier from the at least one carrier, for example, may select a carrier having the largest area in the at least one carrier as the target carrier, in response to determining the target video including the at least one carrier. Then, the electronic device may add the digital watermark to the area of the target carrier in the each frame of image including the target carrier in the target video.

In some alternative implementations of the present embodiment, the determining a target carrier from the at least one carrier may specifically include: first, the electronic device may perform, for each of the at least one carrier, the following steps: step one, extracting an image characteristic of the carrier from the frame of image being first provided with the carrier, for example, histogram of oriented gradient (HOG) characteristic, scale-invariant feature transform (SIFT) characteristic; step two, performing image tracking on the each frame of image subsequent to the frame of image based on the image characteristic of the carrier, and determining whether the carrier exists in the each frame of image subsequent to the frame of image; and step three, counting the number of the frame of image being provided with the carrier in the target video based on an image tracking result. Then, the electronic device may determine, based on the obtained number of the frame of image being provided with the each of the at least one carrier in the target video, the target carrier from the at least one carrier. For example, the electronic device may select the carrier having the largest number of the frame of image being provided with the carrier in the target video in the at least one carrier as the target carrier.

In some alternative implementations, the digital watermark may be a visible watermark; and the adding the digital watermark to an area of the target carrier in the each frame of image including the target carrier in the target video may specifically include: first, the electronic device may adjust a shape of the visible watermark based on the contour and the type of the target carrier. For example, when the target carrier is a circular object, the contour of the target carrier is a circular area surrounded by a plurality of points, the type of the target carrier is circular, and the electronic device may adjust the visible watermark to the circular shape of the same size to that of the target carrier. Then, the shape-adjusted visible watermark is added at the location of the target carrier.

In some alternative implementations, the digital watermark may include a background area and a logo area; and the adding the digital watermark to an area of the target carrier in the each frame of image including the target carrier in the target video may specifically include: first, the electronic device may adjust a color of the background area of the digital watermark according to a color distribution of the target carrier. For example, the electronic device may adjust the color of the background area of the digital watermark to the same color as that of the target carrier. Alternatively, the background area of the digital watermark may be transparent. Then, the electronic device may add the digital watermark having the color of the background area adjusted at the location of the target carrier.

In some alternative implementations of the present embodiment, the method for adding a digital watermark to a video may further include: the electronic device may add the digital watermark at a specified location on the each frame of image in the target video, in response to determining the target video not including the at least one carrier. For example, the upper left corner, the upper right corner, the lower left corner, the lower right corner of the each frame of image.

Figure 3:
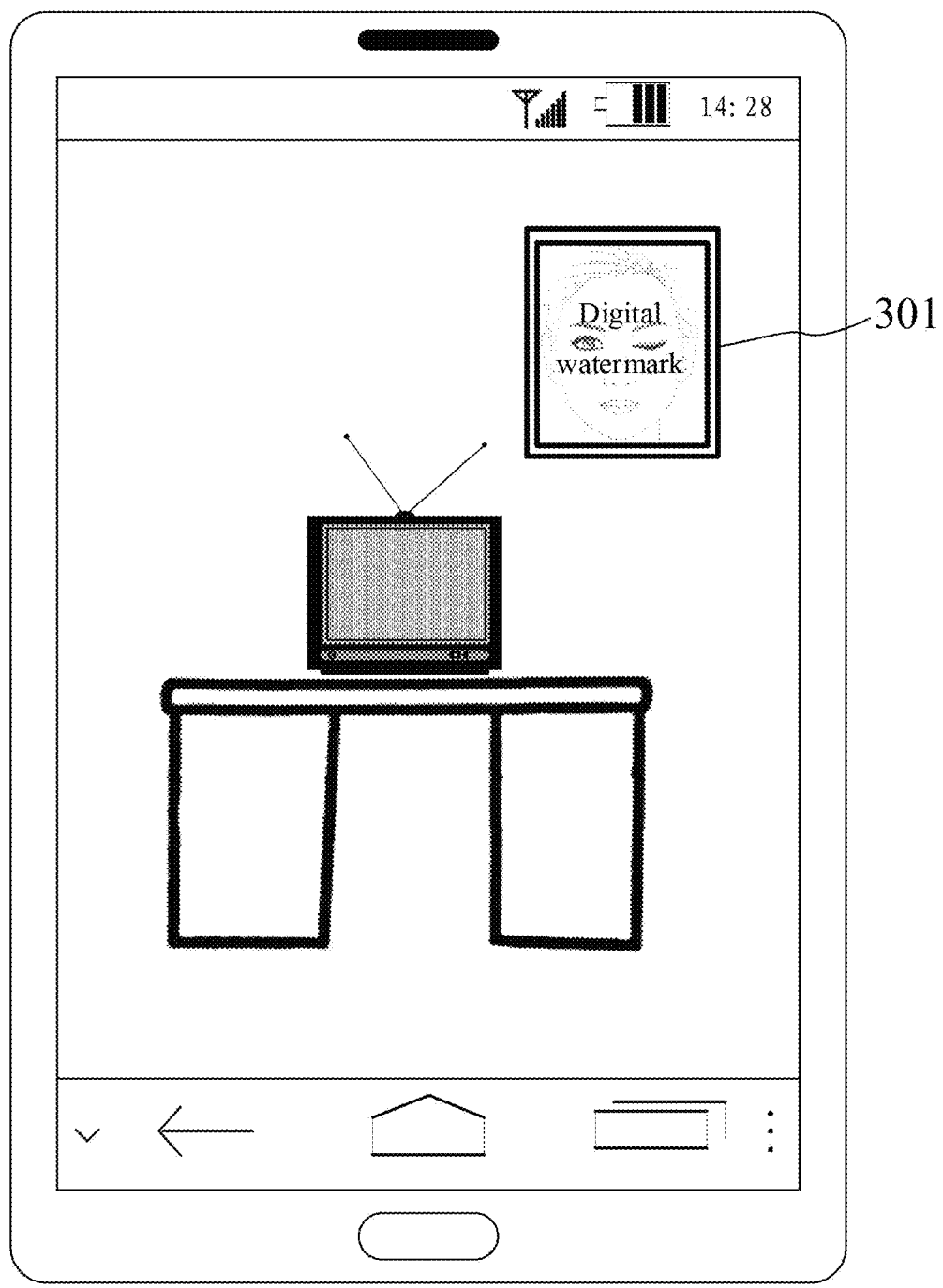
FIG. 3 is a schematic diagram of an application scenario of the method for adding a digital watermark to a video according to the present disclosure.

With further reference to FIG. 3, a schematic diagram of an application scenario of the method for adding a digital watermark to a video according to the present embodiment is illustrated. In the application scenario of FIG. 3, the terminal device first performs target detection on each frame of image in a target video; then determines, based on a target detection result, that the target video includes at least one carrier; and then determines, from the at least one carrier, a rectangular photo frame 301 in the target video as a target carrier, and add the digital watermark to the area of the rectangular photo frame 301 in each frame of image including the rectangular photo frame 301 in the target video. Here, the effect image of adding the digital watermark to a specific frame of image may be as shown in FIG. 3. Since the location of the rectangular photo frame 301 on each frame of image of the target video changes, the location of the digital watermark changes continuously as the location of the rectangular photo frame 301 changes.

The method provided by the above embodiments of the present disclosure adds the digital watermark to the target carrier, thus making the location of the digital watermark continuously changes with the change of the location of the target carrier. Therefore, the added digital watermark may not be easily detected and removed, thereby improving the safety of the video.

Figure 4:
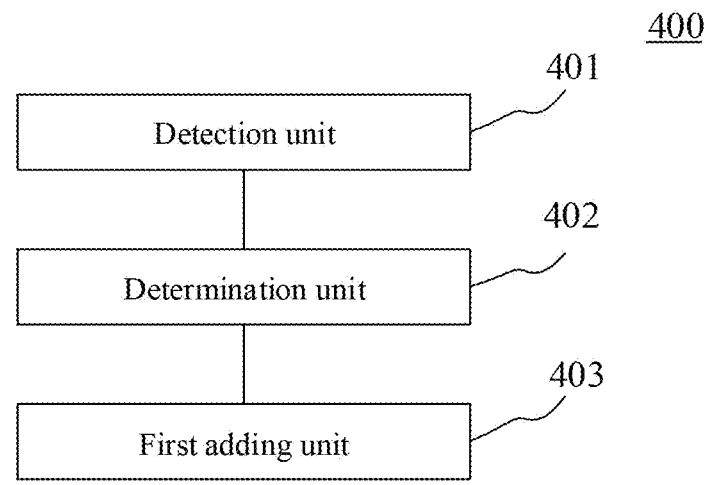
FIG. 4 is a schematic structural diagram of an embodiment of an apparatus for adding a digital watermark to a video according to the present disclosure.

With further reference to FIG. 4, as an implementation to the method shown in the above figures, the present disclosure provides an embodiment of an apparatus for adding a digital watermark to a video. The apparatus embodiment corresponds to the method embodiment shown in FIG. 2, and the apparatus may specifically be applied to various electronic devices.

As shown in FIG. 4, the apparatus 400 for adding a digital watermark to a video of the present embodiment includes: a detection unit 401, a determination unit 402, and a first adding unit 403. Here, the detection unit 401 is configured to perform target detection on each frame of image in a target video. The determination unit 402 is configured to determine, based on a target detection result, whether the target video includes at least one carrier, the carrier referring to an object for adding a digital watermark in the each frame of image. The first adding unit 403 is configured to determine a target carrier from the at least one carrier, and add the digital watermark to an area of the target carrier in the each frame of image including the target carrier in the target video, in response to determining the target video including the at least one carrier.

In the present embodiment, in the apparatus 400 for adding a digital watermark to a video, the specific processing of the detection unit 401, the determination unit 402, and the first adding unit 403, and the technical effects thereof may be respectively referred to the related descriptions of step 201, step 202 and step 203 in the corresponding embodiment of FIG. 2, and detailed description thereof will be omitted.

In some alternative implementations of the present embodiment, the first adding unit 403 may be further configured to: import the each frame of image in the target video into a pre-established target detection model to obtain a contour, a location, and a type of the carrier in the each frame of image, wherein the target detection model is used to represent a corresponding relationship between the each frame of image and the contour, the location, and the type of the carrier.

In some alternative implementations of the present embodiment, the target detection model may be a neural network model; and the apparatus 400 may further include a training unit (not shown in the figure), configured to: determine a sample image as an input sample, and determine the contour, the location, and the type of the carrier included in the sample image as an output sample; and train an initial neural network using the input sample and the output sample to obtain the neural network model.

In some alternative implementations of the present embodiment, the first adding unit 403 may be further configured to: perform, for each of the at least one carrier, the following steps: extracting an image characteristic of the carrier from the frame of image being first provided with the carrier; performing image tracking on the each frame of image subsequent to the frame of image based on the image characteristic of the carrier, and determining whether the carrier exists in the each frame of image subsequent to the frame of image; and counting a number of the frame of image being provided with the carrier in the target video based on an image tracking result; and determine, based on the obtained number of the frame of image being provided with the each of the at least one carrier in the target video, the target carrier from the at least one carrier.

In some alternative implementations of the present embodiment, the apparatus 400 may further include: a second adding unit (not shown in the figure), configured to add the digital watermark at a specified location on the each frame of image in the target video, in response to determining the target video not including the at least one carrier.

In some alternative implementations of the present embodiment, the digital watermark may be a visible watermark; and the first adding unit 403 may be further configured to: adjust a shape of the visible watermark based on the contour and the type of the target carrier; and add the shape-adjusted visible watermark at the location of the target carrier.

In some alternative implementations of the present embodiment, the digital watermark may include a background area and a logo area; and the first adding unit 403 may be further configured to: adjust a color of the background area of the digital watermark according to a color distribution of the target carrier; and add the digital watermark having the color of the background area adjusted at the location of the target carrier.

Figure 5:
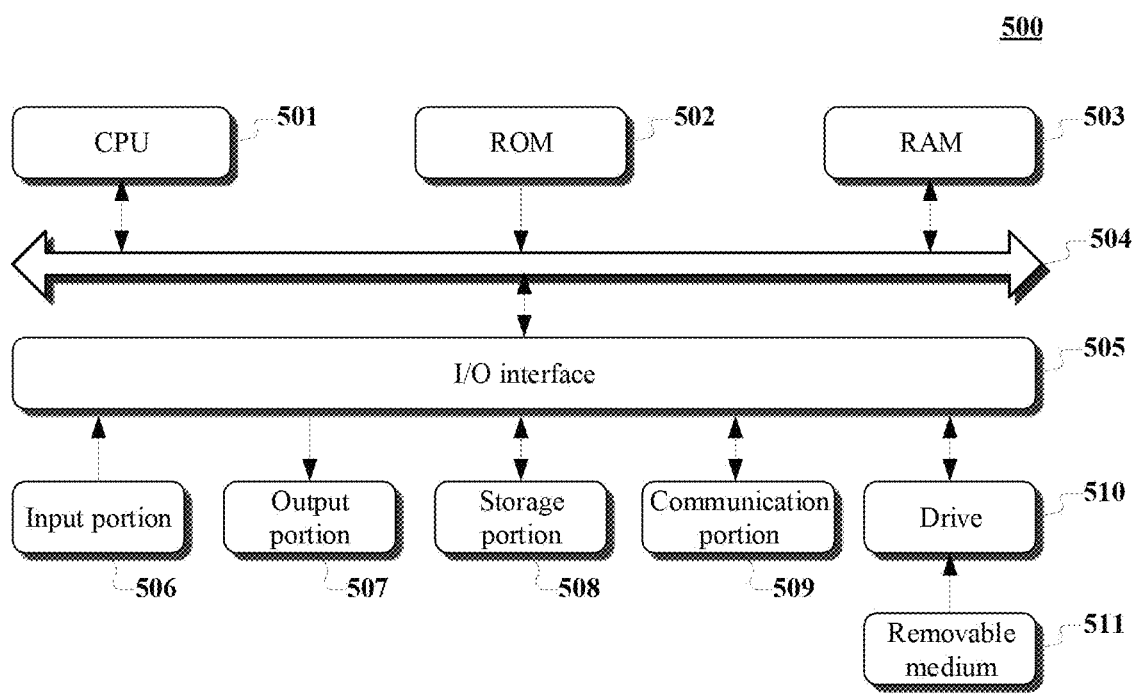
FIG. 5 is a schematic structural diagram of a computer system adapted to implement a terminal device of the embodiments of the present disclosure.

Referring to FIG. 5, a schematic structural diagram of a computer system 500 adapted to implement a terminal device of the embodiments of the present disclosure is shown. The terminal device shown in FIG. 5 is only an example, and is not a limitation to the function and scope of the embodiments of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A drive 510 is also connected to the I/O interface 505 as required. A removable medium 511, such as a magnetic disk, an optical disk, a magneto-optical disk, and a semiconductor memory, may be installed on the drive 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure. It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flowcharts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising a detection unit, a determination unit, and a first adding unit, where the names of these units or modules do not in some cases constitute a limitation to such units or modules themselves. For example, the v unit may also be described as "a unit for performing target detection on each frame of image in a target video."

In another aspect, the present application further provides a non-transitory computer-readable storage medium. The non-transitory computer-readable storage medium may be the non-transitory computer-readable storage medium included in the apparatus in the above described embodiments, or a stand-alone non-transitory computer-readable storage medium not assembled into the apparatus. The non-transitory computer-readable storage medium stores one or more programs. The one or more programs, when executed by a device, cause the device to: perform target detection on each frame of image in a target video; determine, based on a target detection result, whether the target video comprises at least one carrier, the carrier referring to an object for adding a digital watermark in the each frame of image; and determine a target carrier from the at least one carrier, and add the digital watermark to an area of the target carrier in the each frame of image including the target carrier in the target video, in response to determining the target video including the at least one carrier.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for adding a digital watermark in a video, the method comprising:

performing target detection on each frame of image in a target video;

determining, based on a target detection result, whether the target video comprises at least one carrier, a carrier referring to an object in a frame of image and the object being for adding a digital watermark thereon;

in response to determining the target video including the at least one carrier, determining a target carrier from the at least one carrier, comprising:

for each of the at least one carrier, performing following operations: extracting an image characteristic of the carrier from a first frame of image including the carrier; performing, based on the image characteristic of the carrier, image tracking on frames of images subsequent to the first frame of image, to determine whether the carrier is included in the frames of images subsequent to the first frame of image; and counting, based on a result of the image tracking, a number of frames of images including the carrier in the target video; and determining, based on counted numbers, the target carrier from the at least one carrier; and adding the digital watermark to an area of the target carrier in the each frame of image including the target carrier in the target video.

2. The method according to claim 1, wherein the performing target detection on each frame of image in a target video comprises:

importing the each frame of image in the target video into a pre-established target detection model to obtain a contour, a location, and a type of the carrier in the each frame of image, wherein the target detection model is used to represent a corresponding relationship between the each frame of image and the contour, the location, and the type of the carrier.

3. The method according to claim 2, wherein the target detection model is a neural network model; and the method further comprises steps of training the target detection model, comprising:

determining a sample image as an input sample, and determining the contour, the location, and the type of the carrier included in the sample image as an output sample; and training an initial neural network using the input sample and the output sample to obtain the neural network model.

4. The method according to claim 1, wherein the method further comprises:

adding the digital watermark at a specified location on the each frame of image in the target video, in response to determining the target video not including the at least one carrier.

5. The method according to claim 2, wherein the digital watermark is a visible watermark; and the adding the digital watermark to an area of the target carrier in the each frame of image including the target carrier in the target video comprises:

adjusting a shape of the visible watermark based on the contour and the type of the target carrier; and
adding the shape-adjusted visible watermark at the location of the target carrier.

6. The method according to claim 2, wherein the digital watermark comprises a background area and a logo area; and the adding the digital watermark to an area of the target carrier in the each frame of image including the target carrier in the target video comprises:

adjusting a color of the background area of the digital watermark according to a color distribution of the target carrier; and adding the digital watermark having the color of the background area adjusted at the location of the target carrier.

7. An apparatus for adding a digital watermark in a video, the apparatus comprising:

at least one processor; and a memory storing instructions, the instructions when executed by the at least one processor, cause the at least one processor to perform operations, the operations comprising:

performing target detection on each frame of image in a target video;

determining, based on a target detection result, whether the target video comprises at least one carrier, a carrier referring to an object in a frame of image and the object being for adding a digital watermark thereon;

in response to determining the target video including the at least one carrier, determining a target carrier from the at least one carrier, comprising:

for each of the at least one carrier, performing following operations: extracting an image characteristic of the carrier from a first frame of image including the carrier; performing, based on the image characteristic of the carrier, image tracking on frames of images subsequent to the first frame of image, to determine whether the carrier is included in the frames of images subsequent to the first frame of image; and counting, based on a result of the image tracking, a number of frames of images including the carrier in the target video; and determining, based on counted numbers, the target carrier from the at least one carrier; and adding the digital watermark to an area of the target carrier in the each frame of image including the target carrier in the target video.

8. The apparatus according to claim 7, wherein the performing target detection on each frame of image in a target video comprises:

importing the each frame of image in the target video into a pre-established target detection model to obtain a contour, a location, and a type of the carrier in the each frame of image, wherein the target detection model is used to represent a corresponding relationship between the each frame of image and the contour, the location, and the type of the carrier.

9. The apparatus according to claim 8, wherein the target detection model is a neural network model; and the apparatus further comprises steps of training the target detection model, comprising:

determining a sample image as an input sample, and determining the contour, the location, and the type of the carrier included in the sample image as an output sample; and training an initial neural network using the input sample and the output sample to obtain the neural network model.

10. The apparatus according to claim 7, wherein the operations further comprise:
adding the digital watermark at a specified location on the each frame of image in the target video, in response to determining the target video not including the at least one carrier.

11. The apparatus according to claim 8, wherein the digital watermark is a visible watermark; and
the adding the digital watermark to an area of the target carrier in the each frame of image including the target carrier in the target video comprises:
adjusting a shape of the visible watermark based on the contour and the type of the target carrier; and
adding the shape-adjusted visible watermark at the location of the target carrier.

12. The apparatus according to claim 8, wherein the digital watermark comprises a background area and a logo area; and
the adding the digital watermark to an area of the target carrier in the each frame of image including the target carrier in the target video comprises:
adjusting a color of the background area of the digital watermark according to a color distribution of the target carrier; and
adding the digital watermark having the color of the background area adjusted at the location of the target carrier.

13. A non-transitory computer-readable storage medium storing a computer program, the computer program when executed by one or more processors, causes the one or more processors to perform operations, the operations comprising:
performing target detection on each frame of image in a target video;
determining, based on a target detection result, whether the target video comprises at least one carrier, a carrier referring to an object in a frame of image and the object being for adding a digital watermark thereon;
in response to determining the target video including the at least one carrier, determining a target carrier from the at least one carrier, comprising:
for each of the at least one carrier, performing following operations: extracting an image characteristic of the carrier from a first frame of image including the carrier; performing, based on the image characteristic of the carrier, image tracking on frames of images subsequent to the first frame of image, to determine whether the carrier is included in the frames of images subsequent to the first frame of image; and counting, based on a result of the image tracking, a number of frames of images including the carrier in the target video; and
determining, based on counted numbers, the target carrier from the at least one carrier; and
adding the digital watermark to an area of the target carrier in the each frame of image including the target carrier in the target video.

* * * * *